(12) United States Patent
Park et al.

(10) Patent No.: US 11,614,378 B2
(45) Date of Patent: Mar. 28, 2023

(54) POLYMERIC NANOCOMPOSITE BASED SENSOR AND COATING SYSTEMS AND THEIR APPLICATIONS

(71) Applicant: DIRECT-C LIMITED, Edmonton (CA)

(72) Inventors: Simon Park, Calgary (CA); Stephen James Edmondson, North Bradley (GB); Adrian Banica, Edmonton (CA); Kaushik Parmar, Calgary (CA); Xiaomeng Wei, Calgary (CA)

(73) Assignee: DIRECT-C LIMITED, Edmonton (CA)

( * ) Notice: Subject to any disclaimer, the term of this patent is extended or adjusted under 35 U.S.C. 154(b) by 763 days.

(21) Appl. No.: 16/476,268

(22) PCT Filed: Jan. 5, 2018

(86) PCT No.: PCT/CA2018/050013
§ 371 (c)(1),
(2) Date: Jul. 5, 2019

(87) PCT Pub. No.: WO2018/126326
PCT Pub. Date: Jul. 12, 2018

(65) Prior Publication Data
US 2019/0353550 A1 Nov. 21, 2019

Related U.S. Application Data

(60) Provisional application No. 62/443,170, filed on Jan. 6, 2017.

(51) Int. Cl.
*G01M 3/18* (2006.01)
*F16L 58/10* (2006.01)
(Continued)

(52) U.S. Cl.
CPC .............. *G01M 3/18* (2013.01); *C09D 5/002* (2013.01); *C09D 5/24* (2013.01); *C09D 123/00* (2013.01);
(Continued)

(58) Field of Classification Search
CPC .......... G01M 3/18; C09J 9/02; G01N 27/126; G01N 27/127
See application file for complete search history.

(56) References Cited

U.S. PATENT DOCUMENTS

| | | | |
|---|---|---|---|
| 3,383,863 | A | 5/1968 | Berry |
| 3,788,890 | A | 1/1974 | Mader et al. |

(Continued)

FOREIGN PATENT DOCUMENTS

| | | |
|---|---|---|
| CN | 204064593 | 12/2014 |
| WO | 2015054784 | 4/2015 |
| WO | 2016001640 | 1/2016 |

OTHER PUBLICATIONS

Thesis by Xiaomeng (Sherrie) Wei; Novel Approach to Identify and Localize Chemical Leakages in Pipelines; Feb. 8, 2016, all pages.
(Continued)

*Primary Examiner* — Alvaro E Fortich
*Assistant Examiner* — Adam S Clarke
(74) *Attorney, Agent, or Firm* — Lambert Intellectual Property Law

(57) ABSTRACT

A system and method for direct and/or active detection and monitoring of civil engineering or other infrastructural structures, and in a preferred embodiment, for hydrocarbon leakage in oil and gas pipelines, storage structures, and/or transportation structures. Particularly, the system and method relate to various nanocomposite sensor coating and data gathering systems. In one embodiment, the apparatus includes a single measurement sensor coating (thin film)
(Continued)

sensor. Other embodiments relate to multiple measurement sensor coating systems. The sensor is comprised of either a discrete conductive filament layer, or a single or multiple mesh of interwoven filaments of conductive material in one direction and nonconductive material in a perpendicular direction, as a substrate coated with sensitive coating materials to form a sensor grid. Various embodiments of the sensor coating and their applications are also disclosed.

20 Claims, 10 Drawing Sheets

(51) Int. Cl.
| | |
|---|---|
| G01N 27/12 | (2006.01) |
| C09D 5/00 | (2006.01) |
| C09D 5/24 | (2006.01) |
| C09D 123/00 | (2006.01) |
| C09D 163/00 | (2006.01) |
| C09J 9/02 | (2006.01) |
| C23F 13/04 | (2006.01) |
| C23F 13/06 | (2006.01) |

(52) U.S. Cl.
CPC ............. *C09D 163/00* (2013.01); *C09J 9/02* (2013.01); *C23F 13/04* (2013.01); *C23F 13/06* (2013.01); *F16L 58/1054* (2013.01); *G01N 27/126* (2013.01); *G01N 27/127* (2013.01); *C23F 2213/32* (2013.01)

(56) References Cited

U.S. PATENT DOCUMENTS

| | | |
|---|---|---|
| 4,404,516 A | 9/1983 | Johnson, Jr. |
| 5,982,959 A | 11/1999 | Hopenfeld |
| 6,753,520 B2 | 6/2004 | Spirin et al. |
| 7,030,974 B2 | 4/2006 | Spirin et al. |
| 8,568,027 B2 | 10/2013 | Ivanov et al. |
| 8,669,952 B2 | 3/2014 | Hashimura et al. |
| 9,658,120 B2 | 5/2017 | Otaka |
| 2003/0052256 A1 | 3/2003 | Spirin et al. |
| 2008/0094051 A1* | 4/2008 | Williams ............ G01N 27/4145 324/76.11 |
| 2015/0211142 A1* | 7/2015 | Thostenson ............ C25D 13/02 428/327 |
| 2016/0238547 A1 | 8/2016 | Park et al. |
| 2017/0059092 A1* | 3/2017 | Zulfiquar .................. F17D 5/06 |
| 2017/0261388 A1* | 9/2017 | Ma .......................... G06F 1/163 |
| 2018/0330594 A1* | 11/2018 | Hummer ................ G08B 21/14 |

OTHER PUBLICATIONS

Kenneth J. Loh et al: Carbon Nanotube Sensing Skins for Spartial Stain and Impact Damage Identification; J. Nondestruct Eval (2009) 28: p. 9-25.

Kaushik Parmar et al.: DFrom the American Society of Mechanical Engineers website: Direct Hydrocarbon Leakage Detection of Pipelines Using Novel Carbon Nanotube Nanocomposites; 2014 10th International Pipeline Conference vol. 1; Sep. 29-Oct. 3, 2014; p. 1-8.

Xixi Zhang et al: Sensitivity Alteration of Fiber Bragg Grating Sensors With Additive Micro-Scale Bi-Matrial Coatings; Meas. Sci. Technol 24 (2013) p. 1-10.

Amir Azhari et al: A Novel Fibre Bragg Grating Sensor Packaging Design for Ultra-Higt Temperature Sensing in Harsh Environments; Meas. Sci, Technol. 25 (2014), p. 1-11.

* cited by examiner

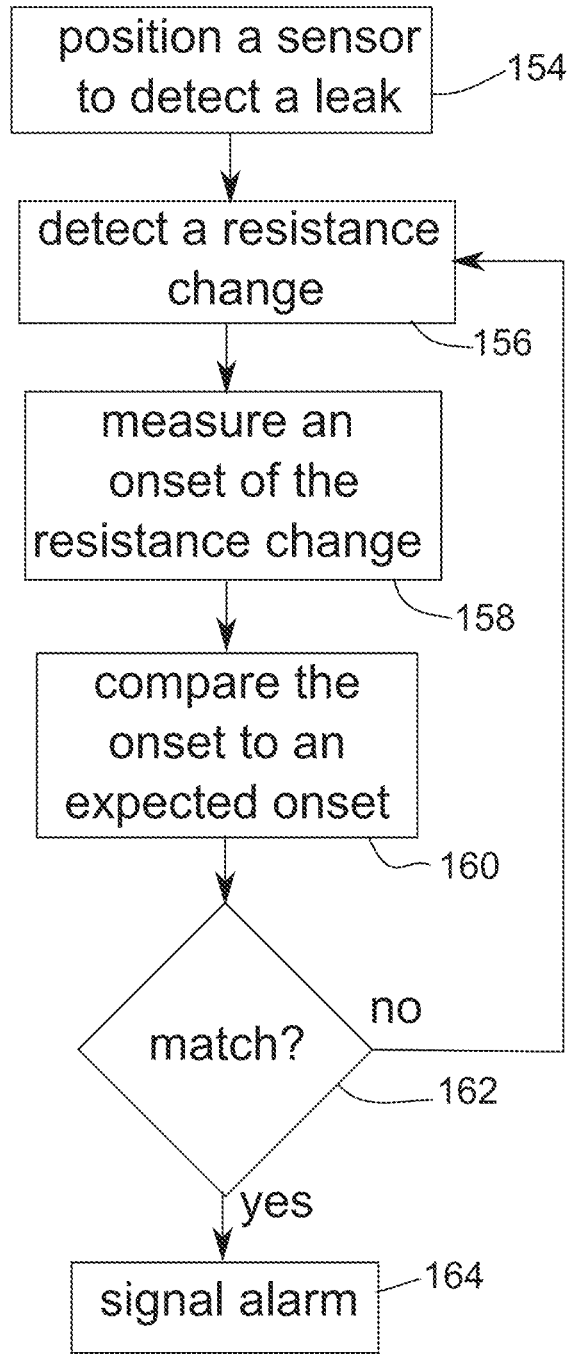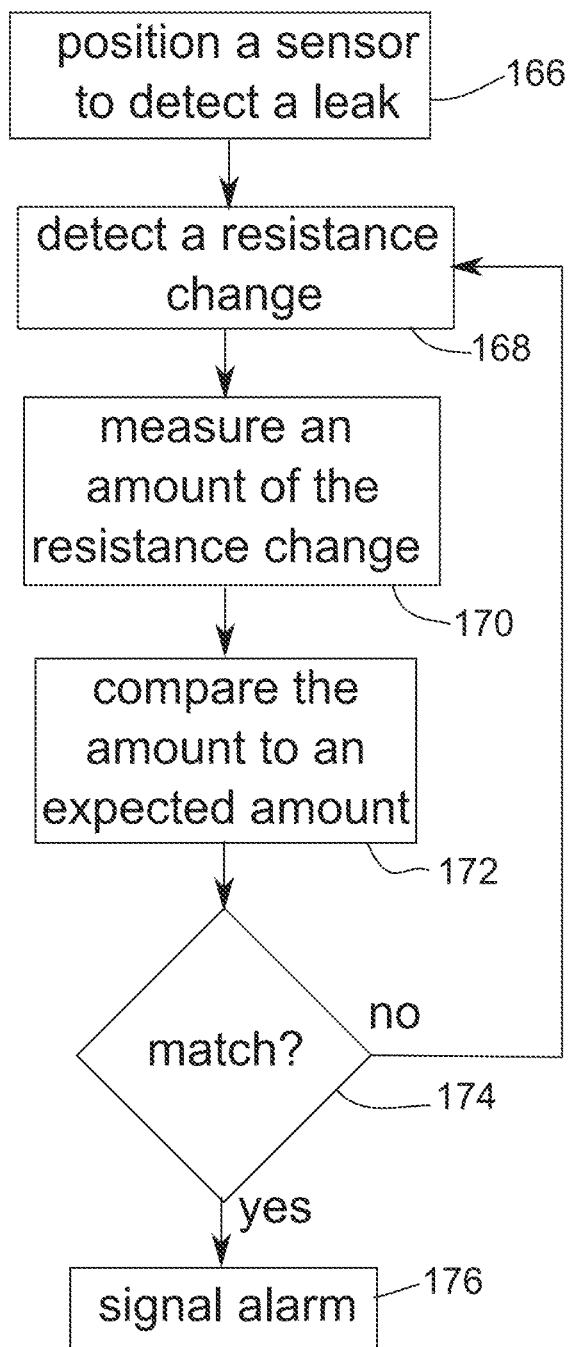

POLYMERIC NANOCOMPOSITE BASED SENSOR AND COATING SYSTEMS AND THEIR APPLICATIONS

TECHNICAL FIELD

Surface sensing coatings.

BACKGROUND

The modern world depends on an extensive and complex system of infrastructure such as bridges, buildings, public transport, and goods transportation systems. For optimal quality of performance, the continuous monitoring of these complex structures or large surfaces for damage and fatigue is essential. Without proper monitoring, the structures can deteriorate and/or corrode causing structure failure. Chemical storage and transportation structures such as pipelines, storage tanks and the like can leak upon failure, causing environmental damage and material loss. Repair and/or replacement and clean up costs due to structure failure can be astronomical.

The concept of surface coating or thin film sensors to be actively used for continuous sensing and monitoring of such structures is one ideal solution for such circumstance. Surface coatings on such structures are extensively used for harsh environmental protection, corrosion shielding and aesthetic appearance. However, conventional coatings are either at best passive indicators or in the worst case, detrimental to structural health monitoring, as structure degradation can stay invisible behind a surface coating until the coated structure fails.

The present disclosure identifies a method of fabrication and application of a surface coating that can actively monitor a structure when it is applied as a surface coating on that structure. The present disclosure identifies methods and a variety of apparatuses embodied either as a single measurement thin film sensor coating sensor or as multiple measurements surface coating devices.

There are various methods proposed in prior art to use surface coatings for structural sensing and monitoring. US patent US20140083196 A1 titled, "Smart coating and method for manufacturing the same" describes a smart coating used as a piezoelectric sensor which uses a five-layer structure for force measurement. The layers include wear-resistant layers, multiple insulating layers, and multiple sensing layers with electrode and piezoelectric sensing material.

US patent 20050283276 A1 titled, "Real time subsea monitoring and control system for pipelines" discloses installing a monitor system along the outside of a subsea pipeline comprising a wrap with rugged fibre-optic sensor and communications fibres inside the wrapping or coating. Heaters and thermal sensing are discussed, and the aim is to predict when the pipeline's interior surface becomes fouled with hydrates, asphaltenes or other materials, and then to trigger a treatment such as injection of a solvent or other active material into the flow inside the pipe.

International patent WO2014110268 A1 titled, "Smart pipe concept based on embedded taggant-sensor and/or color-encoded elements to monitor liner wear in lined pipelines, including urethane lined pipe" describes the use of a chemically modified liner or coating with a feature to indicate liner wear in pipelines. The coating/liner mentioned is composed of a functionalized polymer sensor which contains taggant material. A change of the taggant in the coating/liner can be analyzed to indicate a corresponding change in the wear of the lining of the pipeline. The coating/liner does not itself communicate but releases the taggant into the process fluid flowing in the pipeline, permitting an analysis of the process fluid to reveal the presence of the released taggant, in order to infer a change in the liner/coating, with only very approximate location information.

U.S. Pat. No. 4,856,993 "Pressure and contact sensor system for measuring dental occlusion" describes a contact sensor which has a two-layer structure. The top layer is a flexible circuit which is composed of parallel rows of electrodes with a polyester film backing. The bottom layer is also a flexible circuit composed of parallel columns of electrodes with a polyester film backing. A pressure-sensitive resistive ink is coated on the row electrodes. The two layers are overlapped over each other to enable measurement of the resistance of the strain-sensitive ink and locations of variations in that resistance, to indicate differences in pressure deforming material and changing the resistance of the ink. A difficulty with this type of contact sensor is of its use of two flexible circuits with polyester backing.

SUMMARY

In this disclosure, a method is proposed for structural sensing and monitoring through application of specific coating materials which are capable of sensing structural deformation and warning of failure parameters. A new method of surface coating comprising one or more mesh communication systems is disclosed, which can provide sensing and monitoring capabilities to the surface coating of a structure. Such coating can provide continuous health monitoring of the structure. The coating is an integration of sensitive coating material embedded with a flexible mesh circuit. The mesh circuit consists of interwoven conductive filaments in one direction and nonconductive filaments in a perpendicular direction. Once the coating is applied to a surface, it conveys electrical signals through conductive filaments in the mesh to data processing electronics. The signals provide information relative to the state of the structure underlying specific locations adjacent to specific parts of the mesh, which provides information about the state of the structure, and compiled with earlier similar information, can provide meaningful information about changes to the structure. The composition of a suitable type of chemi-resistive material is disclosed in PCT/CA2014/050992.

There is provided a sensor system having parallel conductive filaments oriented in a first direction, a stimulus sensitive material arranged to connect the parallel conductive filaments, the stimulus sensitive material having a resistivity which changes with exposure to a stimulus, the stimulus including at least one of: presence of a hydrocarbon, temperature, pressure, stress, or strain on the stimulus sensitive material; and a signal conditioning module connected to the parallel conductive filaments and configured to measure resistance between adjacent parallel conductive filaments.

In various embodiments, there may be included any one or more of the following features: the parallel conductive filaments maybe interwoven with non-conductive filaments oriented in a second direction perpendicular to the first direction to form a mesh. The parallel conductive filaments may be embedded in a nonconductive fabric.

There is further provided a sensor system having a first layer and a second layer, the first layer comprising parallel conductive filaments oriented in a first direction, and the second layer comprising parallel conductive filaments oriented in a second direction different from the first direction, each of the first layer and the second layer including a stimulus sensitive material arranged to connect the parallel conductive filaments of the respective layer, the stimulus sensitive material having a resistivity which changes with exposure to a stimulus, the stimulus including at least one of: presence of a hydrocarbon, temperature, pressure, stress, or strain on the stimulus sensitive material; the sensor system also having an insulating layer between and separating the first layer and the second layer; and a first signal conditioning module connected to the parallel conductive filaments of the first layer and configured to measure resistance between adjacent parallel conductive filaments of the first layer, and a second signal conditioning module connected to the parallel conductive filaments of the second layer and configured to measure resistance between adjacent parallel conductive filaments of the second layer. The first signal conditioning module may be the second signal conditioning module.

There is further provided a sensor system having a first layer, a second layer and a third layer, the first layer comprising parallel conductive filaments oriented in a first direction, the second layer comprising parallel conductive filaments oriented in a second direction different from the first direction, and the third layer comprising parallel conductive filaments oriented in a third direction, each of the first layer, the second layer and the third layer including a stimulus sensitive material arranged to connect the parallel conductive filaments of the respective layer, the stimulus sensitive material having a resistivity which changes with exposure to a hydrocarbon, the sensor system also having an insulating layer between and separating the first layer and the second layer, the third layer being separated from the first layer and the second layer by a known thickness of a medium permeable to the hydrocarbon, a first signal conditioning module connected to the parallel conductive filaments of the first layer and configured to measure resistance between adjacent parallel conductive filaments of the first layer, a second signal conditioning module connected to the parallel conductive filaments of the second layer and configured to measure resistance between adjacent parallel conductive filaments of the second layer, and a third signal conditioning module connected to the parallel conductive filaments of the third layer and configured to measure resistance between adjacent parallel conductive filaments of the third layer.

In various embodiments, there may be included any one or more of the following features: the third direction may be one of the first direction or the second direction. The first signal conditioning module may be the second signal conditioning module. The first signal conditioning module may be the third signal conditioning module.

There is further provided a sensor system having a first layer and a second layer, the first layer comprising parallel conductive filaments oriented in a first direction, and the second layer comprising parallel conductive filaments oriented in a second direction, each of the first layer and the second layer including a stimulus sensitive material arranged to connect the parallel conductive filaments of the respective layer, the stimulus sensitive material having a resistivity which changes with exposure to a hydrocarbon, the first layer being separated from the third layer by a known thickness of a medium permeable to the hydrocarbon, and a first signal conditioning module connected to the parallel conductive filaments of the first layer and configured to measure resistance between adjacent parallel conductive filaments of the first layer; and a second signal conditioning module connected to the parallel conductive filaments of the second layer and configured to measure resistance between adjacent parallel conductive filaments of the second layer.

In various embodiments, there may be included any one or more of the following features: the first direction may be the second direction. The first signal conditioning module may be the second signal conditioning module.

There is further provided a sensor system having a tubular structure configured to be buried in the ground with a first end at a ground surface and a second end away from the ground surface, the tubular structure defining openings at the first end and the second end, the opening at the second end covered by a porous membrane for allowing a hydrocarbon to migrate to a sensor within the tubular structure, the sensor within the tubular structure comprising a material having a resistance which changes in the presence of the hydrocarbon and electronics arranged to measure the resistance of the material. The sensor system of may also have a cover for the opening at the first end. The sensor within the tubular structure may be any of the sensor systems as described above, or a different sensor.

There is further provided a sensor system having a tubular structure configured to be buried in the ground with a first end at a ground surface and a second end away from the ground surface, and a sensor system on the tubular structure, the sensor system on the tubular structure being a sensor system according to any of the sensor systems described above other than the sensor system having the tubular structure.

In various embodiments, there may be included any one or more of the following features: the tubular structure may define an opening at the first end. There may be a cover for the opening at the first end. There may be one or more additional sensors within the tubular structure. There may be an opening at the second covered by a porous membrane for allowing a hydrocarbon to migrate to a sensor of the one or more additional sensors within the tubular structure.

There is further provided an arrangement of multiple sensor systems having tubular structures as defined above, the multiple sensor systems placed at known distances from each other and connected to a processing system for measuring delays between detections of hydrocarbons at different sensor systems.

Any of the non-tubular sensor systems described above may be applied to an outer surface of a supporting structure for installation near a potential hydrocarbon leak source.

There is further provided a coating for a pipeline, the coating having a fusion bond epoxy layer adjacent to an outer surface of the pipeline, a sensor layer; and an adhesive layer bonding the sensor layer to the fusion bond epoxy layer. The sensor layer may form part of a sensor system as described above. There may also be a protective layer applied on top of the sensor layer.

There is further provided a coating for a pipeline having a fusion bond epoxy layer adjacent to an outer surface of the pipeline, a polyolefin layer, an adhesive layer bonding the polyolefin layer to the fusion bond epoxy layer, and a sensor layer bonded to the polyolefin layer. The sensor layer may forms part of a sensor system as described above. There may be an additional adhesive layer bonding the sensor layer to the polyolefin layer. There may be a protective layer applied on top of the sensor layer.

There is further provided a belt wrap for wrapping around a field joint of a pipe, the belt wrap having a sensor layer. The sensor layer may form at least part of a sensor system as described above.

There is further provided a patch for a hydrocarbon storage or transportation system, the patch having a sensor layer. The sensor layer may form at least part of a sensor system as described above.

There is further provided a shrink wrap sleeve for a field joint of a pipe, the shrink wrap sleeve having a sensor layer. The sensor layer may form at least part of a sensor system as described above. There may be one or more additional layers for providing additional protection to the field joint.

There is further provided a coating for a pipe comprising a sensor layer applied on top of a liquid epoxy. The sensor layer may also include a liquid epoxy and the liquid epoxy of the sensor layer may include a material which swells in the presence of a hydrocarbon, and conductive or semiconductive particles suspended in the liquid epoxy. The conductive or semiconductive particles may comprise carbon nanotubes. The sensor layer may form at least a part of a sensor system as described above.

There is further provided a sensor system for an underground structure having a cathodic protection system, the sensor system having a stimulus sensitive material with a resistance which changes with exposure to a stimulus, the stimulus including at least one of: presence of a hydrocarbon, temperature, pressure, stress, or strain on the stimulus sensitive material, the sensor system also having a first electrical connection to a first part of the structure or of the cathodic protection system, and a second electrical connection to a second part of the structure or of the cathodic protection system, the first part and the second part caused to have different voltages by the cathodic protection system, the first electrical connection and the second electrical connection arranged to supply the different voltages to different locations separated by the stimulus sensitive material, and a measurement device configured to measure an electrical response to the supply of the different voltages to the different locations to measure the resistance of the stimulus sensitive material. There may also be a further measurement device configured to measure the cathodic protection current. The measurement device may be the further measurement device. The stimulus sensitive material and the measurement device form at least part of a sensor system as described above.

There is further provided a method of detecting a liquid hydrocarbon leak, the method comprising positioning a sensor to be exposed to a liquid hydrocarbon leak from a potential hydrocarbon leak source, the sensor including a stimulus sensitive material with a resistivity that changes with exposure to hydrocarbons, detecting a resistance change in the stimulus sensitive material, measuring a characteristic of an onset of the resistance change, comparing the characteristic of the onset of the resistance change to an expected characteristic of the onset of the resistance change for an expected contents of the potential hydrocarbon leak source, and signaling an alarm on the characteristic of the onset matching the expected characteristic. The characteristic of the onset may be a rate of the resistance change. The rate of the resistance change may be measured over a time period of 10 seconds. The characteristic of the onset may also be a shape of a curve representing the resistance change over time.

There is further provided a method of detecting a gaseous hydrocarbon leak, the method comprising positioning a sensor to be exposed to a gaseous hydrocarbon leak from a potential hydrocarbon leak source, the sensor including a stimulus sensitive material with a resistivity that changes with exposure to hydrocarbons, detecting a resistance change in the stimulus sensitive material, measuring the amount of the resistance change, comparing the amount of the resistance change to an expected amount of resistance change for an expected contents of the potential hydrocarbon leak source, and signaling an alarm on the amount of the resistance change matching the expected amount of the resistance change.

These and other aspects of the device and method are set out in the claims.

BRIEF DESCRIPTION OF THE FIGURES

Embodiments will now be described with reference to the figures, in which like reference characters denote like elements, by way of example, and in which:

FIG. 20 is a flow chart showing a method of detecting a liquid hydrocarbon leak.

FIG. 21 is a flow chart showing an exemplary method for detecting a gaseous hydrocarbon leak.

DETAILED DESCRIPTION

There is provided a system and method of application of a smart coating with various embodiments which is by way of example but is in no way meant to limit the disclosure and its applications, this specification being limited only by the claims. The description that follows and the embodiments described therein, are provided by way of illustration of examples, and of embodiments of the system and method. Particularly, the description includes multiple measurement systems such as sensor coating systems and flexible wrap systems, and single point measure systems. These examples are provided for the purposes of explanation, and not of limitation, of those principles and of the invention as defined by the claims.

Immaterial modifications may be made to the embodiments described here without departing from what is covered by the claims.

Mesh Based Sensor Coating Communications Systems and their Application to Pipelines:

In one embodiment, a sensor coating may be made of a sensitive coating material incorporating a mesh. The mesh embedded in the sensor coating comprises nonconductive filaments woven in a first direction and conductive filaments woven in a second and perpendicular direction.

Depending on the embodiment, the sensor coating may surround the mesh, be adjacent to the mesh (e.g. above or below the mesh with respect to a surface which the sensor coating is applied to) or it may be applied to a portion of the mesh, for example the sensor coating may be applied to the non-conductive filaments woven in the first direction.

The nonconductive material of the mesh should preferably be inert to water and/or moisture and certain chemicals. It should preferably have high heat resistance and high tensile strength, and be capable of being formed in thin filaments. Examples of suitable nonconductive filaments include polyethylene terephthalate (PET), nylon, polyester, fiberglass, and the like.

The response of the surface coating is transmitted through the conductive filaments and analyzed to determine the structural health of a structure to which the coating and mesh have been applied. To optimize performance of the conductive filaments in the mesh, the conductive filament material should preferably have excellent electric conductivity and should be inert to water or moisture, and be capable of being formed in thin filaments. Examples of suitable conductive filaments include gold, platinum, silver, copper, electrically conductive carbon, and the like.

Figure 1:
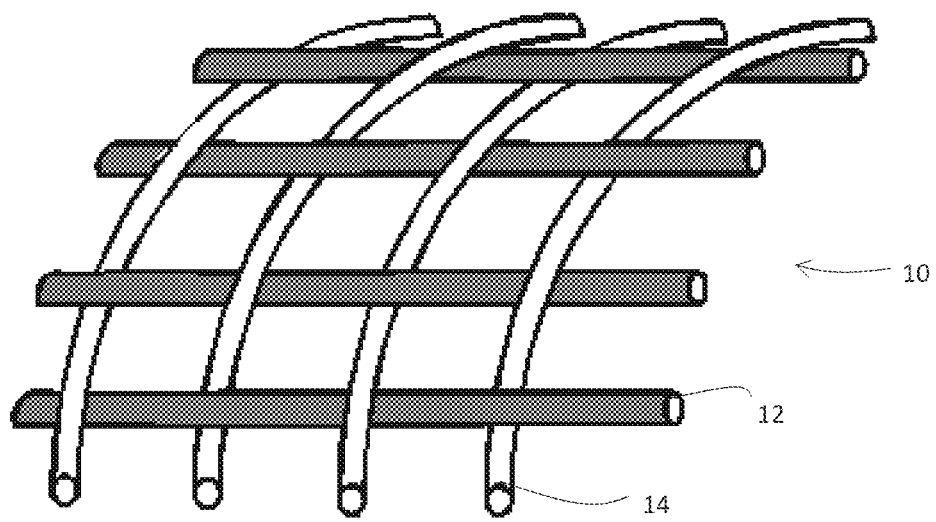
FIG. 1 is a schematic drawing of a mesh for sensing.

In one embodiment, the mesh is composed of a fabric consisting of nonconductive polyethylene terephthalate (PET) yarn woven in one direction and conductive copper monofilaments woven in a perpendicular direction. The two types of filament may be woven in a plain woven manner which results in flexibility and permeabilty, and conductivity in the direction of the copper monofilaments. FIG. 1 shows a schematic drawing of an example mesh 10 comprising non-conductive lines 12 and conductive lines 14.

The woven mesh serves as a substrate to the coating materials and the conductive filaments in the mesh allow transport of electrical signals from local portions of the coating to an electronics support system where the signals can be recorded and processed. The flexibility of the mesh enables it to tightly bond around the structure to which it and the coating are applied and to accommodate some stress and movement without damage. The flexibility of the woven mesh allows it to be folded, rolled, or wadded up for storage. The discrete conductive filaments in adjacent rows running in a specific direction allow the system to acquire electrical signals from different locations along the structure. The spacing of the mesh can be adjusted according to the sensing resolution requirement of the sensing system.

Additional nonconductive filaments may be added between and parallel to the conductive filaments to assist in spacing the conductive filaments.

The electrical signals from conductive filaments of the mesh from affected portions of the coating are transmitted to external electronics in an electronics support system. In one embodiment, the sensing coating has the required electronics to facilitate signal transmission to a microcontroller connected thereto. In other embodiments, any suitable electronics system can be used which is capable of receiving and analyzing multiple analog signals coming from conductive filaments of the mesh in a suitable fashion to provide meaningful information.

Figure 2:
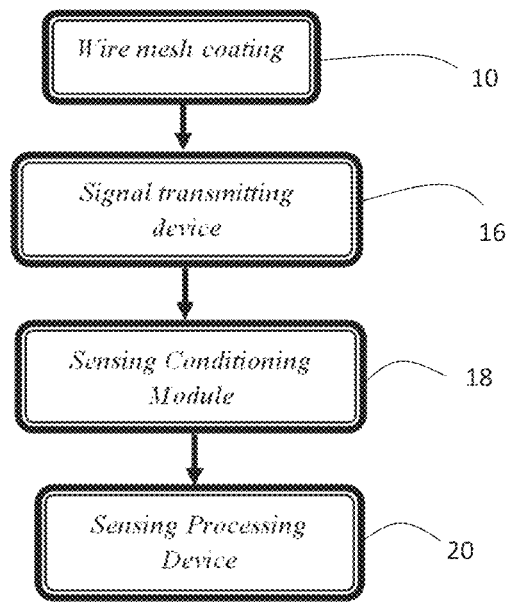
FIG. 2 is a block diagram showing information flow between inter-relating parts of a smart coating system.

As shown in FIG. 2, the proposed coating system comprises a signal transmitting device 16 such as a master cable which connects conductive filaments of the mesh 10 and coating to a control box of a signal conditioning module 18. The signal conditioning module 18 may comprise a power supply, driving circuit, data acquisition circuit and comparison circuit, and may remotely communicates with a processing device 20, for instance a suitably programmed common laptop computer or other processing device capable of supporting wireless communication. Processed signal data can be output by a variety of known external apparatus and displayed on a display device, for instance an LCD video display.

Details regarding the fabrication and application of certain embodiments are described in the examples below.

Example 1: Sensor Coating for Hydrocarbon Leakage on Tubular Structures Such as Pipelines Including a Related 1 Dimensional Mesh Communication System Deployed on the Structure's Surface A prior PCT Patent Application No. PCT/CA2014/050992 describes a suitable chemi-resistive nanocomposite material and composition for a hydrocarbon sensitive coating, and would be useful for a coating material in the sensor systems described here. After dilution with appropriate solvents, the nanocomposite material can be sprayed on, brushed on or extruded onto a mesh substrate (described above) and then functions as a hydrocarbon leakage detector coating with signal system. Examples of 3-layer pipeline coating system and 5 layered coating system are described below. Subsequently, a one dimensional mesh communication system for a tubular or pipeline sensor coating is illustrated.

A stimulus sensitive material, sensor material, sensor, sensor layer or coating that may be used comprises a polymer; and conductive and/or semi conductive nanoparticles admixed with and dispersed within the polymer. The polymer may comprise synthetic rubber, (ii) polyvinyl chloride, (iii) polymetheyacrylate, (iv) silicone based polymer; or (v) thermoplastic polymer, or a polysiloxane copolymer or a thermoplastic polymer disclosed in PCT/CA2014/050992 or U.S. application Ser. No. 15/030,029, the content of each of which is hereby incorporated by reference herein where permitted by law. The nanoparticles may comprise one or more of (i) gold, (ii) platinum, (iii) silver, (iv) copper, (v) nickel, (vi) ferrite, and (vii) electrically conductive carbon such as carbon nanotubes, including multiwalled carbon nanotubes, and/or graphene nanoplatelets or other materials disclosed in PCT/CA2014/050992 or U.S. application Ser. No. 15/030,029, the content of each of which is hereby incorporated by reference herein where permitted by law. The nanoparticles may be distributed in the polymer sufficiently closely that a quantum mechanical tunnelling effect controls the electrical response of the stimulus sensitive material.

Figure 3:
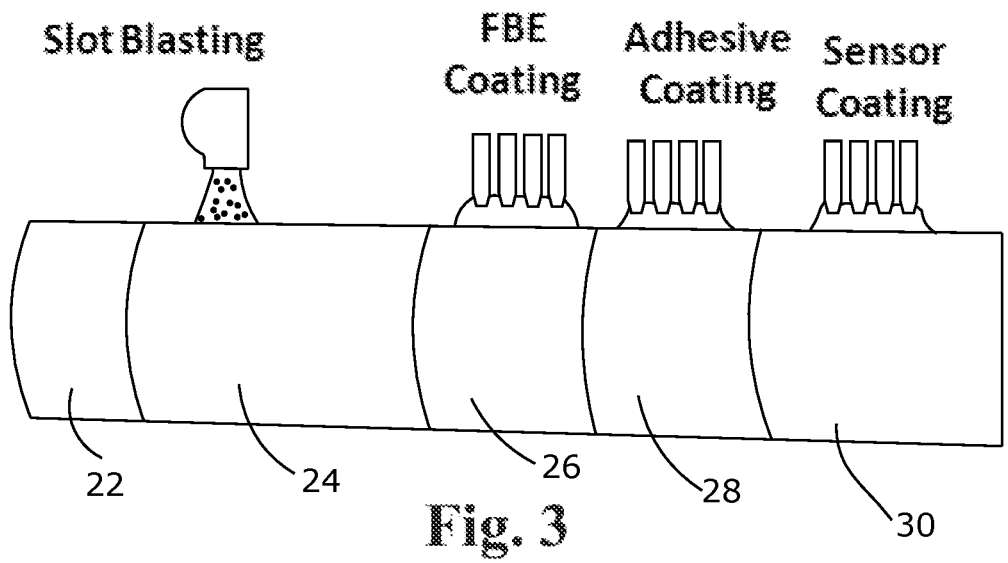
FIG. 3 shows an exemplary 3-layer coating process.

3 Layered Pipeline Coating System:

A three-layer coating may be deployed as shown in FIG. 3. A pipe surface 22 may be initially treated by, for example, slot blasting as shown by slot blasted portion 24 of the pipe surface. A corrosion resistive coating of (for instance) Fusion Bonded Epoxy (FBE) 26 may be applied to the surface of the pipe. A tie layer 28 of adhesive coating may be applied over the epoxy layer 26 to tie a leak sensing coating 30 to the epoxy layer 26. A nanocomposite coating can be easily incorporated into this type of coating process, which allows for easy and effective installation of the leak sensor coating over an entire length of pipe surface. In one embodiment, an optional protective layer of external coating can be applied over the nanocomposite coating.

Figure 4:
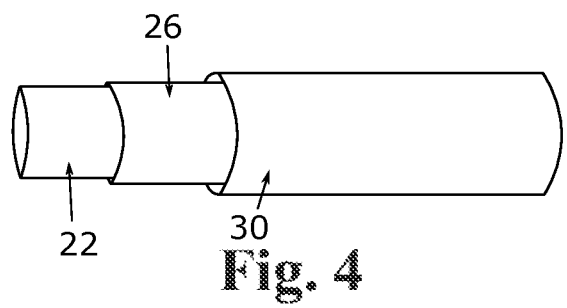
FIG. 4 shows a continuous coating on a steel pipe.
Figure 5:
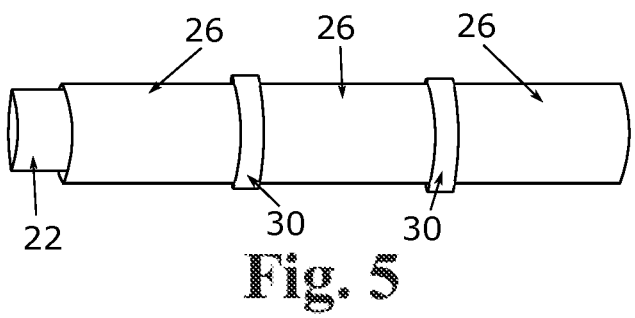
FIG. 5 shows a discrete sensor coating on a steel pipe.

If applied as an outer layer over a length of pipe (including any Field Joints) (FIG. 4), the nanocomposite coating provides 100% coverage along the entire length and entire circumference of the pipe and therefore has the ability to determine the exact location of a hydrocarbon leak/failure. The mesh may be omitted if it is not needed to detect the location of a leak, only its presence. In this case conduction between two terminals (not shown) may be used to determine the presence of a leak. The terminals may be wires arranged lengthwise with respect to the pipe. If the pipe is short enough for conduction to occur along the length of the pipe the terminals may be located at the ends of the pipe and may be arranged circumferentially with respect to the pipe. Alternatively, discrete coating bands as shown in FIG. 5 may be used where a particular target accuracy based on a planned location along the pipe's length is desired. E.g. +/−10 meter accuracy can be achieved by coating nanocomposite material 10 meters apart, or if two bands of nanocomposite coatings are applied to each 12 meter pipe section then an accuracy of +/−6 meters is achieved. Two terminals (not shown) may be used with each length of coating, as with a continuous coating for which the location of the leak is not needed.

When the sensing composite encounters hydrocarbon leaked from the pipeline, the composite's electrical resistance varies, and tracking of the electrical resistance change through the signalling system of the sensor system will provide detailed electrical resistivity change and location information to characterize the hydrocarbon leakage.

Figure 6:
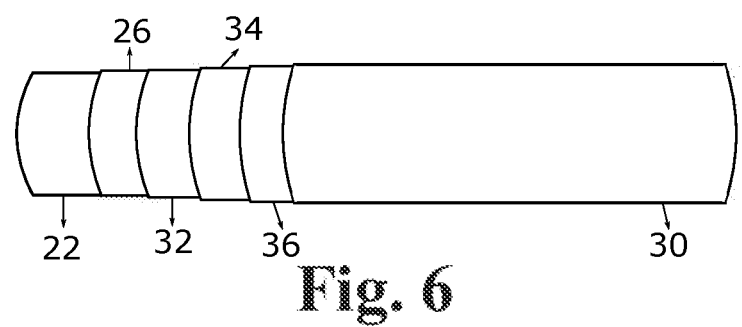
FIG. 6 shows a five-layered coating.

5 Layered Pipeline Coating System:

A five-layer coating system for pipelines features a Fusion Bond Epoxy (FBE) as an anti-corrosion layer 26 adjacent to the outer surface 22 of the pipe's steel, an adhesive layer 32 of adhesive with functional groups which bond to the FBE, a third layer 34 of protective polyolefin, and (optionally a second adhesive layer 36 and) a sensor layer 30 of the combined mesh and coating comprising a smart coating capable of Hydrocarbon (HC) leak detection for reacting to physical stimuli at the outside of the pipe. All of the layers are bonded together. The 5-layered coating system is illustrated in FIG. 6. In one embodiment, an optional protective layer of external coating can be applied over the 5-layer coating.

In another embodiment, a fabric embedded with copper monofibers at a space of 0.5 cm may be incorporated within a sensor coating similar to the mesh communication system described above. The hydrocarbon sensing composite may be spray coated onto the mesh and cured at elevated temperature.

Figure 7:
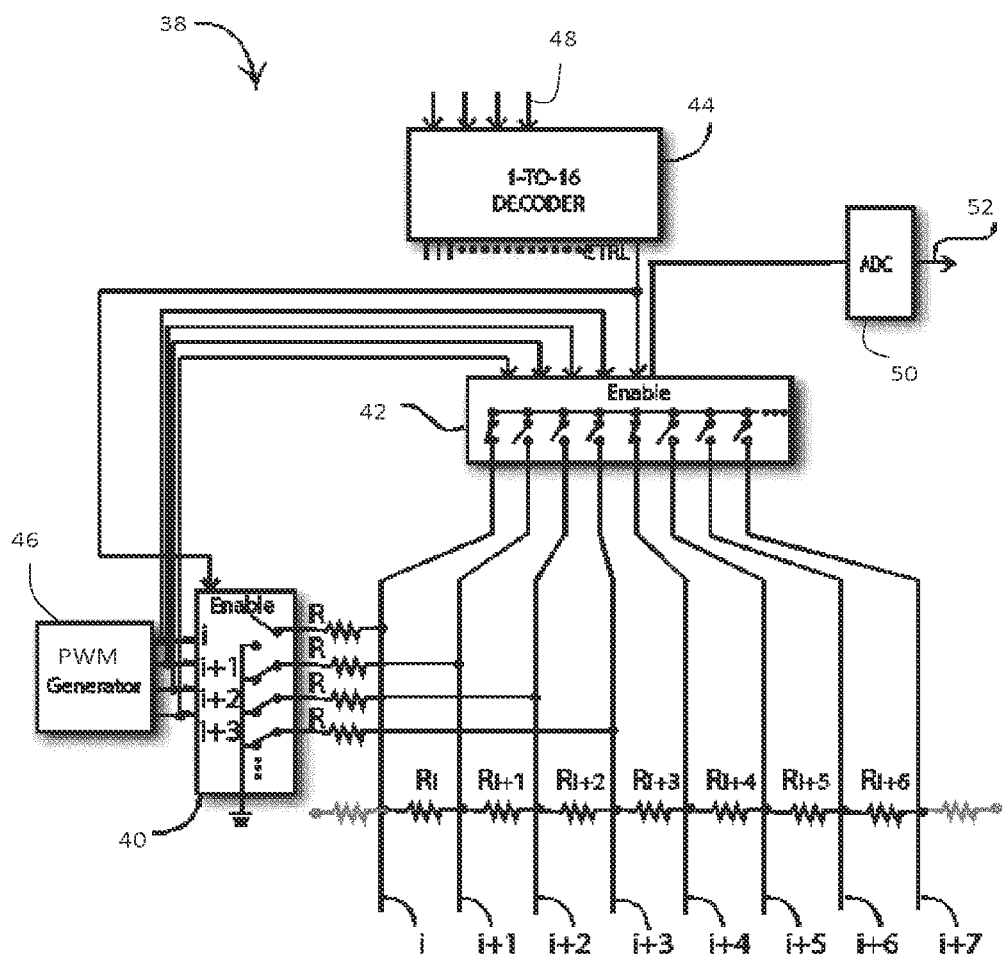
FIG. 7 is an electrical diagram of an example signal conditioning module.

FIG. 7 is an electrical schematic diagram of an example signal conditioning module circuit 38 used to communicate with the hydrocarbon sensitive smart coating. Eight column electrodes labeled i to i+7 represent the selected sensing area. The electrical resistance between each two adjacent column electrodes is characterized by a variable resistance labeled Ri to Ri+6 which is a function of the amount of hydrocarbon oil/gas that gets absorbed in the coating material near to the relevant electrodes.

The subscripts indicate the column associated with each resistance. Every two adjacent column electrodes are sequentially scanned, for example using a shift register 40, to measure the resistance of the hydrocarbon-sensitive coating between adjacent columns to provide an indication of the intensity and position of hydrocarbon absorbed in the sensor material at that relevant axial location. For a hydrocarbon sensitive mesh described herein, a signal conditioning module can comprise one multiplexer 42, one demultiplexer or decoder 44, one microcontroller, and 16 resistors.

Electrical signals for testing resistance may be produced by a pulse width modulation generator 46. Decoder 44 may receive input control signals on control lines 48. An analog-to-digital converter 50 may produce an output 52 for transmission to a processing device.

In an example, 100 μL of hexane was dropped onto the middle section of a 16 column coating (area around columns 8 and 9). The response from each column was then recorded throughout the experiment. Columns 8 and 9 showed the maximum response where hexane was dropped, while the intensity of the response decreased as distance from columns 8 and 9 increases. The intensity at the distant columns 1, 2 or 15 and 16 did not change during the experiment. Since the highest response is nearest the hydrocarbon dropped, the resistivity changes localized between particular columns provide data useful in determining the location of the hydrocarbon leakage.

Figure 8:
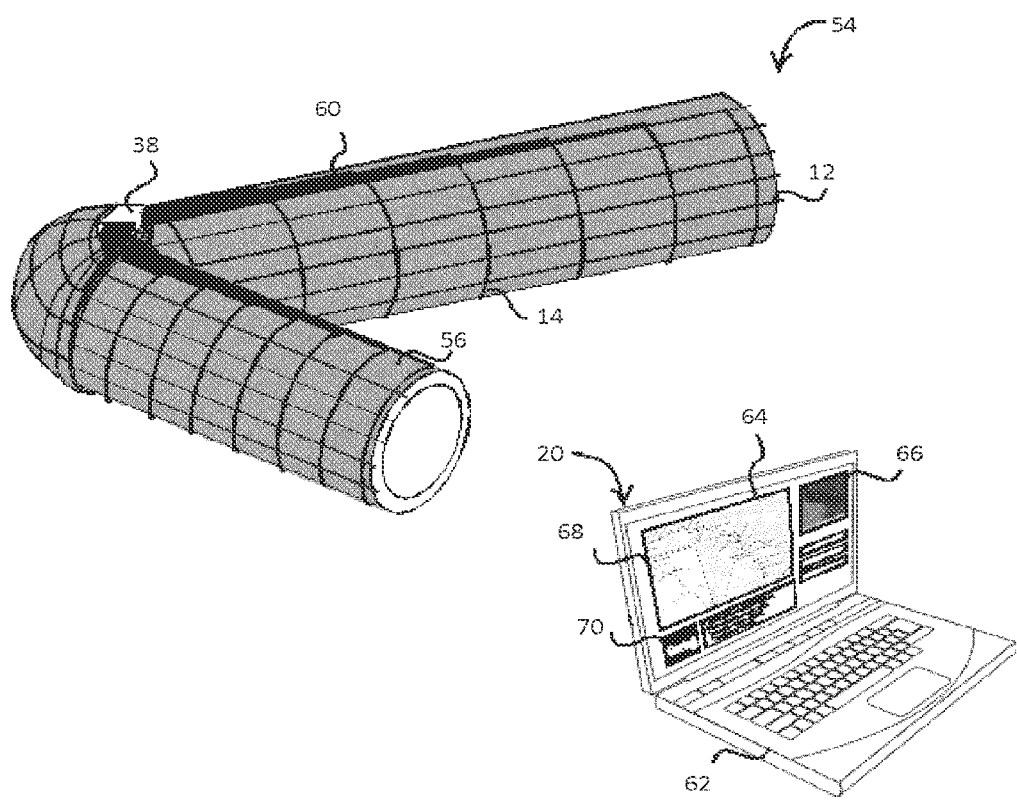
FIG. 8 is a drawing (not to scale) of the application of a 1 dimensional mesh communication system on a pipeline.

The example experiment shows the effectiveness of the hydrocarbon sensitive coating system. The system is able to pinpoint affected columns. Such a one directional coating can be applied to hydrocarbon transporting tubular structures such as pipelines, where the location of a HC leak along the length of the pipe is more essential to pinpoint as compared to the leak's circumferential location around the pipe In an embodiment as illustrated in FIG. 8, a 1 dimensional mesh communication system provided for a HC-sensitive sensor coating is implemented on a hydrocarbon oil or gas pipeline.

The sensor system 54 comprises a mesh with conductive lines 14 and non-conductive lines 12. The mesh cooperates with a sensitive coating 56 to form a smart coating. A flexible ring-shaped insulation-displacement connector (IDC) can be used to connect to the smart coating and sensing conditioning module. The flexible ring-shaped multi-wire electrical connector 60 comprises a double-layered plastic shell. The space within the shell has been divided by electrically insulated separators according to the numbers of groups of transmitting lines. Slave IDC cables from the pipe surface are plugged into the IDC in a certain sequence, which is reflected by the sequence of the outputs on the master IDC cable.

In one embodiment, the master IDC cable is connected with a signal conditioning module 38 which comprises an analog to digital converter for converting an analog signal from the smart coating to a digital signal, a signal amplifier for signal amplification and a remote communication device for long distance data transmission between the sensor set and a processing device 20 using any of a variety of known methods. These methods may include acoustic or radio communication means, including but not limited to meshed radio networks, Bluetooth, WIFI, cellular technologies, satellite or infrared means. The processing device 20 can include a processor and storage means 62 for storing response output data signals gathered from the smart coating, and can be provided with executable programs such as leakage sensing signal analysis and graphics software.

An example graphical display 64 of the processing device 20 shows a leakage pattern 66, a leakage location mapping 68, and an alert 70.

Example 2: Two-Dimensional Mesh Communication System for Sensor Coating

Due to its flexibility, this hydrocarbon sensitive smart coating system can be implemented over any number of different types of structures which are meant to transport, store or contain hydrocarbons such as (but not limited to) pipelines, tanks, conduits or pressure vessels. In many cases it is important to pinpoint the exact leakage location on the surface of the structure of interest. To determine the exact location of a coating sensor resistivity change or reaction, a two dimensional mesh communication system for signal gathering from the sensor coating may be required.

Figure 9:
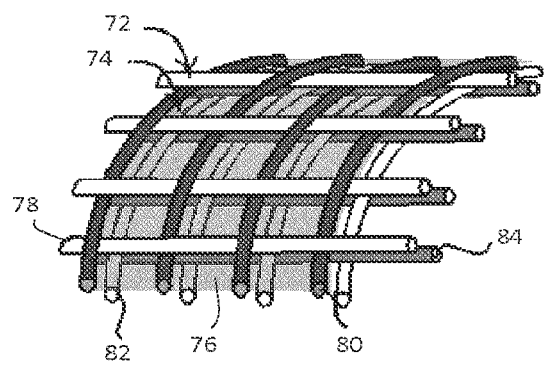
FIG. 9 shows a column-row type sensor mesh

In one embodiment, to provide for collection of coating reactions (sensing data) in both directions, a layered configuration may be used. An example configuration can consist of three layers. Referring to FIG. 9, a first sensing layer 72 is column-type mesh deposited with sensing material, with first layer conductive filaments 78 in a first direction and first layer non-conductive filaments 80 in a second direction. A second sensing layer 74 is a row-type mesh (with second layer conductive filaments 82 in the perpendicular direction to the filaments 78 of the first sensing layer 72) deposited with either similar and/or different sensing material as the first sensing layer 72. The second sensing layer 74 is shown as having second layer non-conductive filaments 84.

An intermediate layer 76 is of an electrical insulation material which separates the conductive elements of the first sensing layer 72 from the second sensing layer 74. In order to locate a two-dimensional leakage location, a two-sensor coating system (mesh spray coated with hydrocarbon sensitive composition described above) may be used in a layered structure (as described above).

Similar to the one-dimensional mesh communication system, a 2D prototype system was tested with 100 µl of hexane. 100 µl of hexane was dropped at the center (location close to $9^{th}$ row and $9^{th}$ column) of the coating of the sample sensor and mesh. The hexane spread over a region between rows 7 to 11 and columns 5 to 11.

The experiment showed that a layered structure of the above embodiment of a 2D smart coating system is able to pinpoint the exact location of hydrocarbon exposure and consequent coating sensing material response. This property of a 2D smart coating array and assembly can be utilized to monitor complex structures and surfaces to determine the location of HC leakage and to infer information about its structural integrity.

Example 3: Three-Dimensional Mesh Communication System for Sensor Coating

Figure 10:
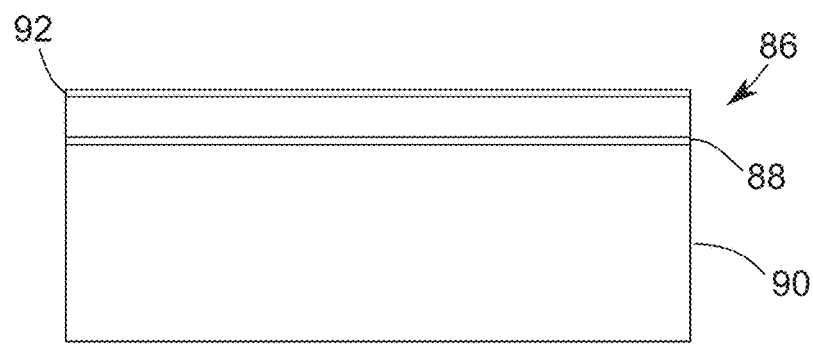
FIG. 10 is a cutaway view of an example of a 3-dimensional mesh communication system.

To provide additional utility, particularly useful in providing safety information, an embodiment may provide for a leak predictive system containing multiple 1D and/or 2D mesh communication systems. Due to the use of two mesh communication systems separated by a sensor coating, thickness measurement is possible. When a 1D and a 2D mesh are used together to fabricate such advanced systems, the system can provide 3 dimensional measurements. One such 3d sensor system 86 is illustrated in FIG. 10. In an embodiment, the 2D mesh 88 is first incorporated onto a coating for the sensor system on or near to the surface of a structure 90 to provide plane length and width location on the structure (a pipe or any other hydrocarbon containing body) and a further 1D mesh structure 92 is installed on top of the first coating. The sensor coating separates the two mesh communication systems. In this example, when there is any breach in the hydrocarbon containing body (leak event), the escaped hydrocarbon is recorded (the coating's reaction to the HC is transmitted by the mesh to the associated signal processing systems) by the 2D mesh before the HC leakage reaches outside the structure and its coatings, often providing time to take preventive measures. Based on the time it takes for the escaped hydrocarbon to reach an adjacent portion of the 1 D mesh, a leak rate can be also calculated. The benefits of the above system are 1) leak location identification to operators or systems capable of responding, 2) Leak rate measurement, 3) data which permits prediction of structure failure before full-blown leakage, 4) additional layers to retard a leak from spreading outside. This type of 3-dimensional mesh communication system is useful for places where structures are exposed to high corrosive environments and/or located in urban areas near communities or other sensitive situations or settings.

Example 4: Patch Sensors Using Mesh Communication System

Figure 11:
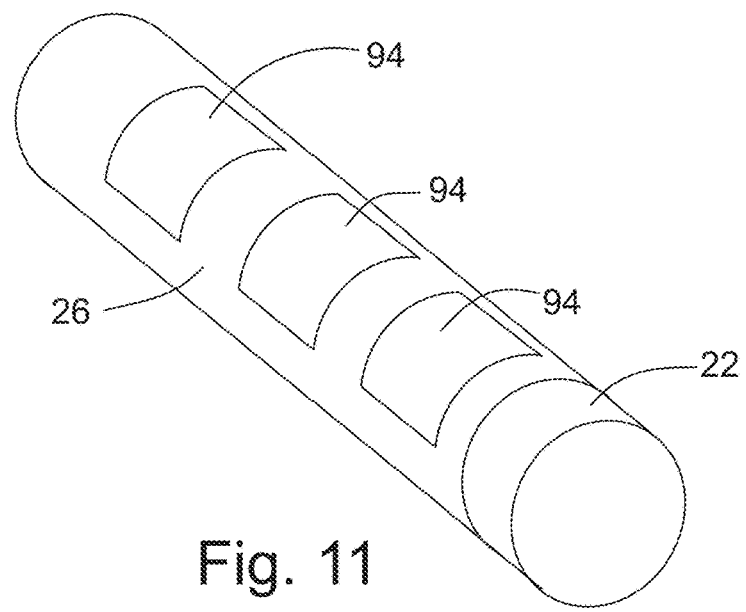
FIG. 11 shows a set of patch sensors on a pipe structure.

In a further embodiment, one or more flexible patches may be fabricated using one of the above mesh communication systems, and applied to a pipe or other hydrocarbon structure to provide an easy to install system (as compared to coating the full or some significant length or area of the pipe or structure). Each patch can be fabricated using either of the 1 D or 2D (or 3D) mesh communication systems above, and fabricated as described above. Some patch sensors 94 are illustrated in FIG. 11. Each patch sensor would be connected to be in communications with an associated data gathering and processing system.

Sensor Systems for Field Joint Monitoring Application on Pipelines

A hydrocarbon sensitive coating such as the ones described in the prior PCT patent application No. PCT/CA2014/050992 can be used in a several embodiments on existing pipelines or installed structures. Such embodiments can be installed on pipelines close to corrosion prone areas of the pipeline such as field joints, bends and slopes to monitor and signal an alarm at certain possible failures or leak events. Some of these embodiments are described below.

Figure 12:
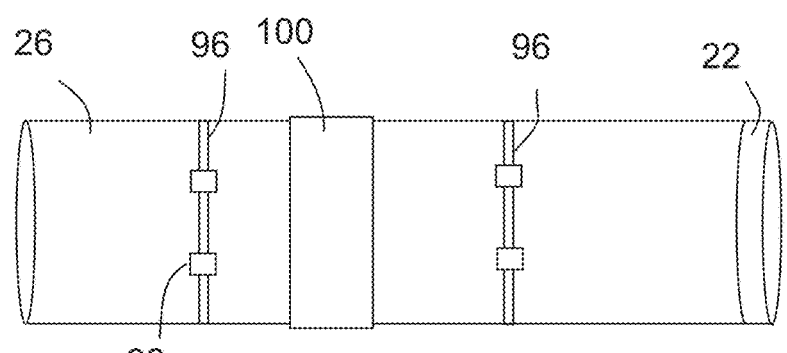
FIG. 12 shows a belt/strap system on a pipe structure.

Belt/Strap System:

A belt/strap leak detection system is a flexible architecture, intended for pipeline monitoring and leak detection as shown in FIG. 12. It contains multiple belt/strap electrode/coating sensor elements 96 wrapped around a pipeline (FIG. 10) with selectable sensor modules 98 including a hydrocarbon sensor module and/or vibration, temperature sensor modules and the like for reacting to various changes in physical properties and structural health of the pipe and surrounding area, and signalling such changes to an associated signal gathering and processing subsystem. This is a preferred method of deployment for existing pipelines, for example. In the example shown the sensors are located near a field joint surrounded by a field joint coating 100.

Figure 13:
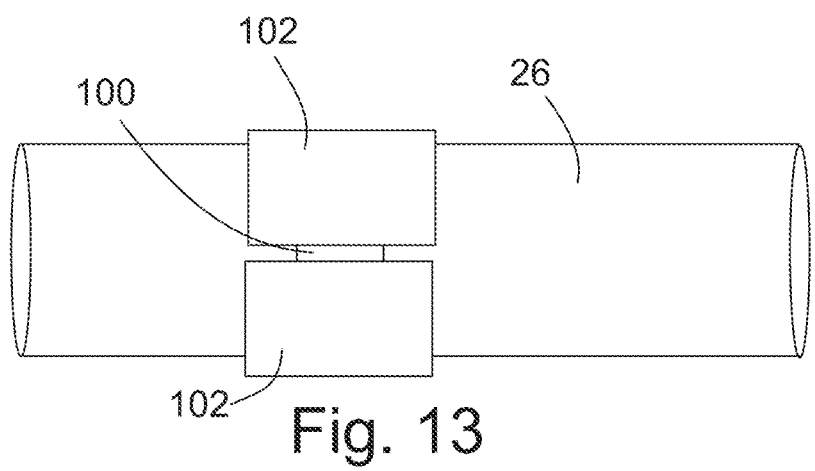
FIG. 13 shows a sleeve system applied on a field joint coating on a pipe structure.

Sleeve Wrap System:

A smart coating which is incorporated into a wrap sleeve to provide both protection to a field joint and a capability of leak detection and reacting to physical stimuli (for instance temperature, motion, stress or strain). FIG. 13 shows the sleeves 102 applied on a field joint.

Sensor Coating:

In one embodiment, a coating system comprising a liquid epoxy formulation admixed with carbon based conductive nanoparticulate and metal oxide semi-conductive nanoparticles or the like can be applied to a hydrocarbon transport structure such as a pipe or section of pipe to provide corrosion protection and capability for HC leak detection and reacting to local physical stimuli.

Figure 14:
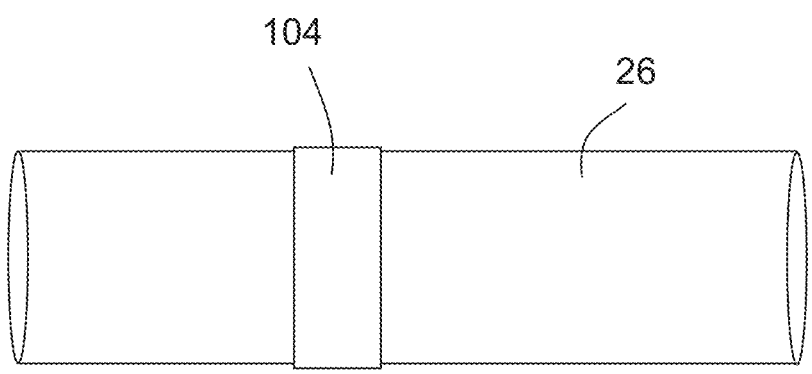
FIG. 14 shows a sensor coating applied around a field joint of a pipe.

A sensor coating 104 applied on top of a liquid epoxy on a pipe or section of pipe (such as in a Field Joint area) as shown in FIG. 14 can add leak detection and detection of physical stimuli to any corrosion protection provided by the liquid epoxy.

Single Measurement Sensor System for Leak Detection

Figure 15:
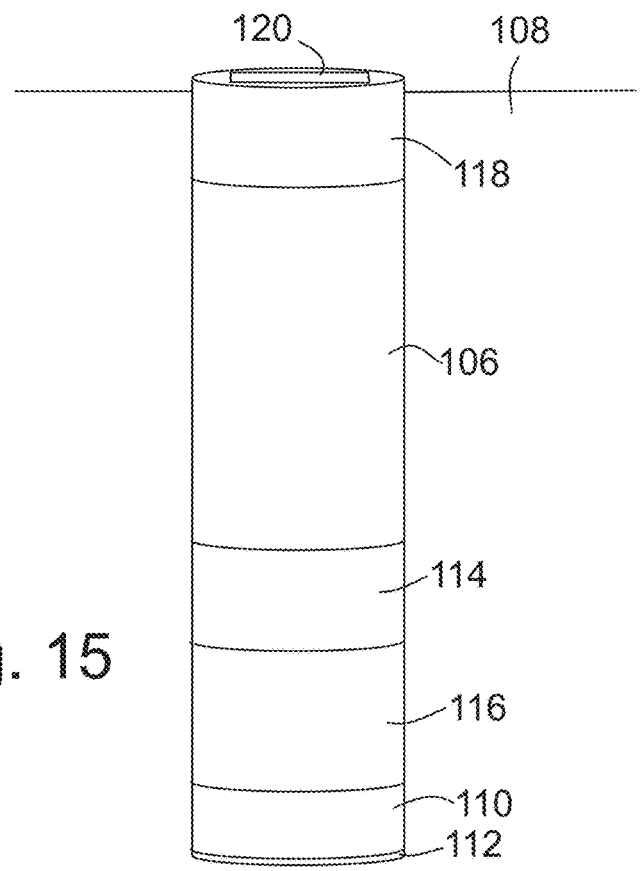
FIG. 15 is a cutaway view showing a subsurface leak detection system embodiment.
Figure 16:
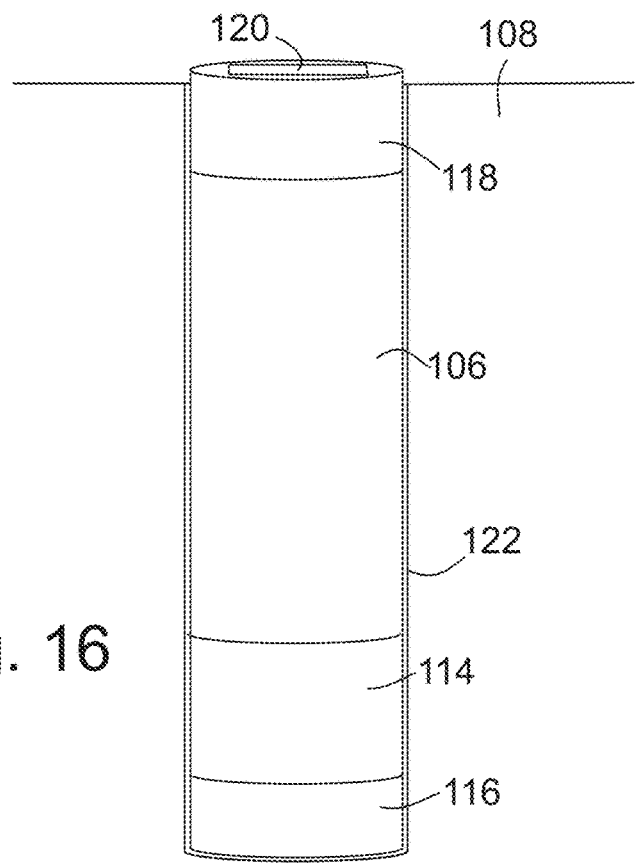
FIG. 16 is a cutaway view showing a further subsurface leak detection system embodiment having a hydrocarbon sensitive coating at an outer casing.

Most installed underground facilities such as wells, pipelines, and underground storage tanks can leak for a long time without detection, resulting in extreme environmental damage before being detected and remediated. In one embodiment, these underground leaks may be detected by a single measurement system referred to here as Subsurface Direct Hydrocarbon Remote Sensor Leak Detection System (also referred as "SubSense LDS"), and examples of which are shown in FIGS. 15 and 16. In one embodiment, shown in FIG. 15, a tube 106 may be embedded in ground 108. A hydrocarbon sensitive module 110 is placed at the bottom of a bore of the tube with porous membrane 112 to allow the sensor to be exposed to any leaked hydrocarbons outside the bore which migrate to near the sensor. There may also be other sensor modules 114 and 116, which may include, for example, temperature, humidity, pH, etc. A controller and other electronics including a battery and communications device may be included in a portion 118 of the tube near the surface. There may be a solar charger 120 at the surface. In another embodiment, shown in FIG. 16, the SubSense LDS comprises an inner or an outer casing coated 122 with a suitable sensor coating composition, such as disclosed in PCT/CA2014/050992. Both embodiments shown in FIGS. 15 and 16 are provided with suitable electronics and data gathering subsystems.

SubSense LDS is capable of a) detecting soil contamination under snow cover b) Preventing major leak through early detection of small and slow leak.

This is a preferred method of deployment for existing high consequence area (HCA) installed structures, such as pipelines near a river crossing (shown in FIG. 17) or urban areas where a HC leak can cause extreme damage.

The SubSense LDS has a modular design, intended for the detection of a hydrocarbon underground, capable of use in extreme conditions. A modular design can allow connecting different types of sensor modules including multiple hydrocarbon sensor modules, with large-area signal gathering and analysis/interpretation/conditioning and reporting systems.

A SubSense LDS can be fully autonomous and can function as a standalone unit that can be monitored manually or via remote telemetry radio access. Multiple SubSense LDS units can be installed in a number of useful configurations, such as a as a fence or perimeter around HCAs to enable early leak detection before any notable damage, protecting adjacent areas (such as a river from migration of HC leaks in groundwater seepage).

Figure 17:
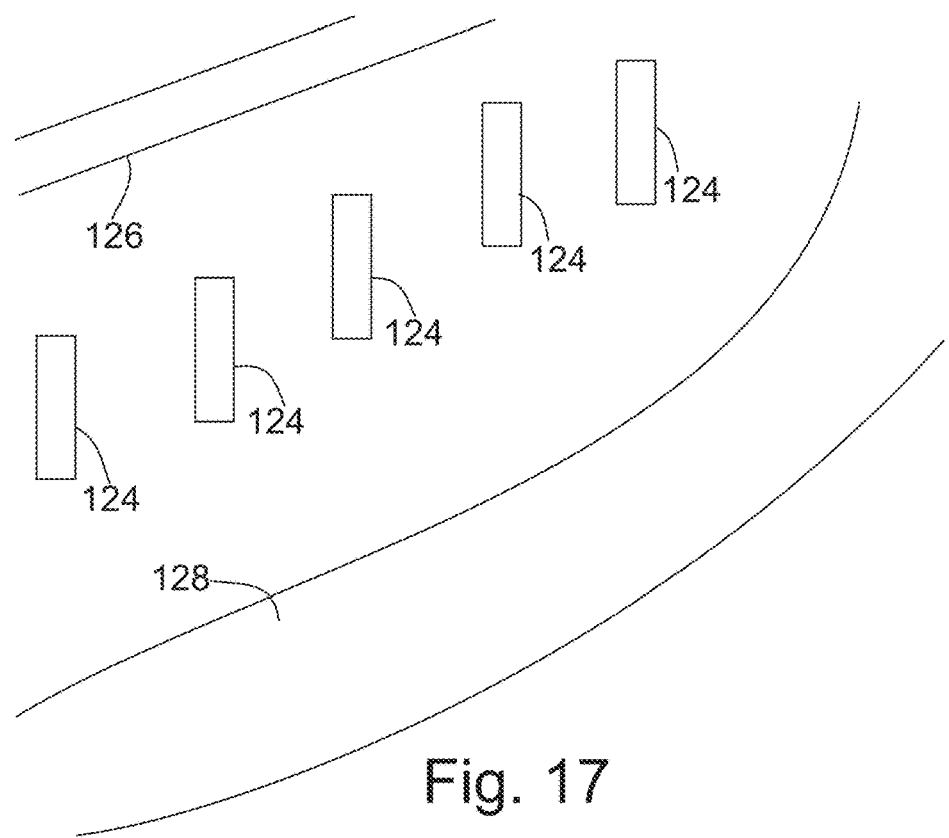
FIG. 17 is an example map showing a subsurface leak detection deployed near a pipeline water crossing.

FIG. 17 shows a schematic diagram of a fence of multiple LDS units 124 for detecting hydrocarbon leakage from a pipeline 126 before it enters a river 128.

Due to their high hydrophobicity and anti-icing properties, certain hydrocarbon sensitive nanocomposite compositions such as those described in the prior PCT Patent Application No. PCT/CA2014/050992 may be ideal for detecting hydrocarbons in freezing underground conditions, and those materials can be considered for used as a sensing material for SubSense.

Power System for Pipeline Leak Detection Coating Systems

In an exemplary embodiment, sensor coatings for pipelines or structures as described above use some applied voltage to operate and detect HC leaks and/or other physical stimuli, and can be used with a cathodic protection system used to polarise the steel structure to prevent corrosion.

Figure 18:
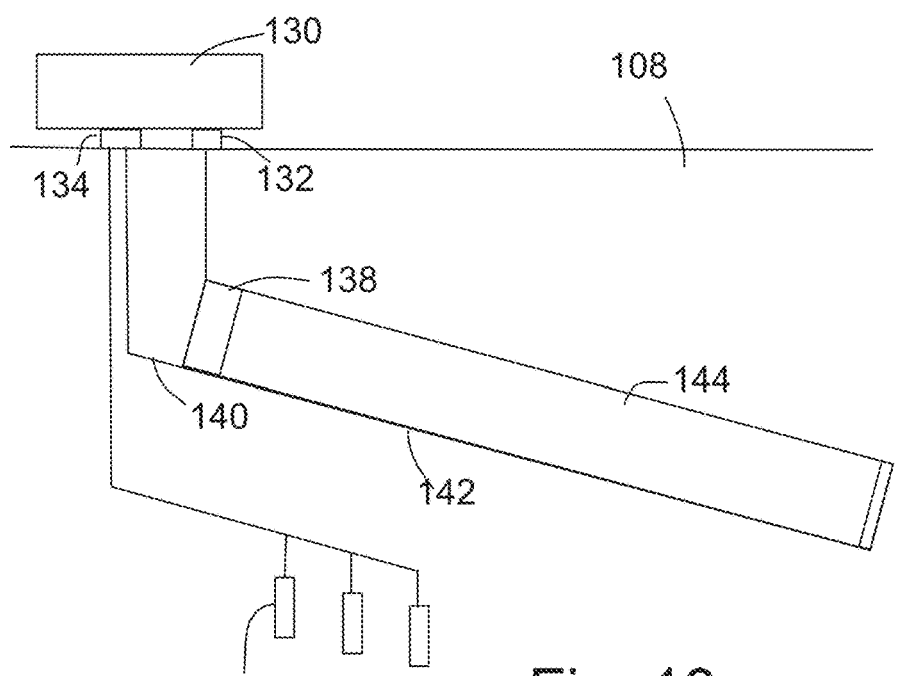
FIG. 18 shows a combined power system for Cathodic protection with a sensor coating of this system.

Most steel based HC pipelines and other significant underground HC containing structures installed in the Americas feature a Cathodic Protection system which applies a voltage to the pipeline or structure to polarize the steel and thus prevent corrosion of the steel. A sensing system can use a portion of the same applied voltage to both polarize the steel to prevent corrosion and to enable the measurement of the electrical resistance of the sensor coating on the pipeline as shown in FIG. 18. Monitoring of the system's coating's electrical resistance at various points on the pipeline or structure is used to detect HC leaks (and may be used to sense other conditions or states of the structure such as temperature, stress, strain, etc.). Using the same power systems, essentially piggybacking on the Cathodic Protection systems, can result in eliminating a requirement for additional power sources for the detection coating systems described here.

As shown in FIG. 18, a cathodic protection system comprises a rectifier 130 with a negative terminal 132 and a positive terminal 134. Anodes 136 are connected to the positive terminal and a corrosion resistant coating 138 is connected to the negative terminal. A further electrical connection 140 connects to a communication cable 142 for a sensor coating 144 to the positive terminal to generate a voltage between the corrosion resistant coating 138 and the communication cable 142 which may provide a current though the sensor coating 144.

Hydrocarbon Selective Detection:

In an embodiment, the smart coating composition is similar to the hydrocarbon sensitive nanocomposite composition described in the prior PCT Patent Application No. PCT/CA2014/050992.

Figure 19:
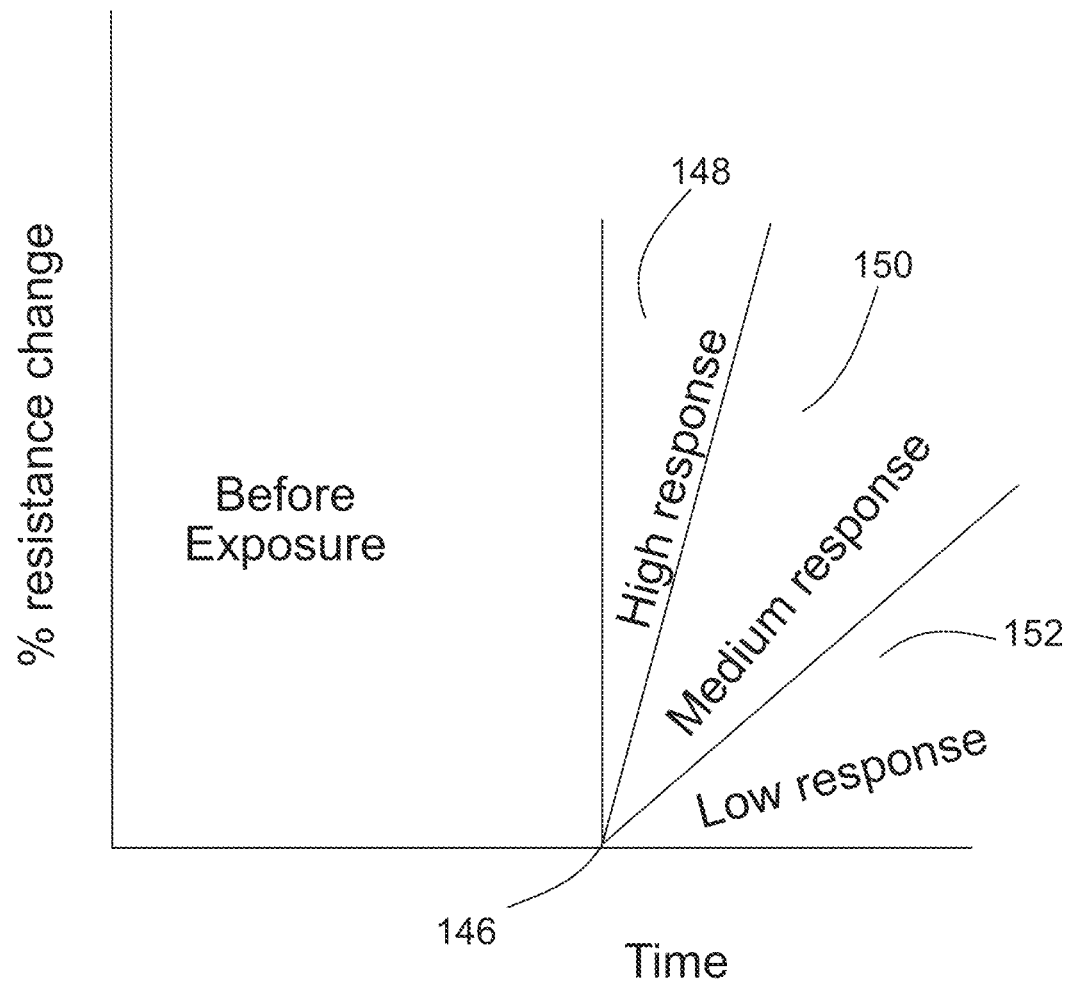
FIG. 19 is a schematic graph illustrating sensor responses to different hydrocarbons.

A method of analysing the rate of change in the resistance of the sensor coating when exposed to hydrocarbon may enable the determination of the type of hydrocarbon present as well as the fact of HC presence. The instantaneous slope (first 10 seconds of sensor response from the exposure event 146 marking the beginning of the response) of the time response of the sensor is measured and then compared to known values for response times of the sensor material to different types of HCs may be used to identify the liquid hydrocarbons causing the coating reaction (electrical resistivity change) response. The sensor response can be measured in the % electrical resistance change of the sensor. Three levels of differentiation can be created based on the response of the sensor as shown in in the example of FIG. 19.

Level 1: A high response region 148 of the graph of FIG. 19 (Slope angle: 75-90 degrees given example scales on the time and resistance change axes) for an example coating material corresponds to highly volatile hydrocarbons such as pentane, hexane, octane and other similar diluents.

Level 2: A medium response region 150 of the graph of FIG. 19 (Slope angle: 40-75 degrees given example scales on the time and resistance change axes) for an example coating material—corresponds to medium volatility hydrocarbons such as diesel, kerosene.

Level 3: A low response region 152 of the graph of FIG. 19 (Slope angle: 0-40 degrees given example scales on the time and resistance change axes) for an example coating material—corresponds to heavy hydrocarbons, refined hydrocarbons, and non-volatile hydrocarbons.

In the case of distinguishing amongst and between gaseous hydrocarbons, % resistance change of the sensor may be evaluated and then compared to known values to identify the hydrocarbons.

An example of the analysis of the sensor coating response to different hydrocarbons is demonstrated in Table 1 (liquids) and Table 2 (gas). The results highlight the capability of a useable sensor composition to distinguish between hydrocarbons. This concept of comparing sensed data to previously known reactivity information for known coating materials enables the selective detection of HCs, which may be useful, for example, in eliminating "false positive" detection of HCs that do not come from the pipeline and thus must be from a source other than a pipeline leak.

TABLE 1

Liquid Phase

| Hydrocarbon | Instantaneous Slope (in degrees first 10 seconds of response) |
| --- | --- |
| Pentane | 89.3 |
| Octane | 88.8 |
| Diesel | 73.4 |
| Crude Oil | 9.3 |
| Motor Oil | 6.3 |

TABLE 2

Gas Phase

| HC | % resistance change |
| --- | --- |
| Methane | 0 |
| Ethane | 4.3% |

It is believed that the differences in slope between different liquid hydrocarbons primarily result from the speed at which they penetrate the sensor coating on contact.

A pipeline may carry a mixture of different materials which may together show a distinctive curve of resistance response over time when leaking.

In one embodiment, diffusivity of the hydrocarbons to a known sensor coating in use on a sensor can be used to determine the type of hydrocarbons the sensor coating is exposed to (rather than or in addition to reactivity or responsivity of the coating material).

FIG. 20 is a flow diagram showing an example method of detecting a liquid hydrocarbon leak. In step 154, a sensor system is positioned to detect a liquid hydrocarbon leak from a potential leak source. The sensor includes a stimulus sensitive material with a resistivity that changes with exposure to a hydrocarbon. In step 156 a resistance change of the stimulus sensitive material is detected. In step 158, a characteristic of an onset of the resistance change is measured. In step 160, the characteristic of the onset is compared to an expected characteristic of the onset for an expected contents of the leak source. In step 162, if the characteristic of the onset matches the expected characteristic, the system proceeds to signal an alarm in step 164.

FIG. 21 is a flow diagram showing an example method of detecting a gaseous hydrocarbon leak. In step 166, a sensor system is positioned to detect a gaseous hydrocarbon leak from a potential leak source. The sensor including a stimulus sensitive material with a resistivity that changes with exposure to a hydrocarbon. In step 168 a resistance change of the stimulus sensitive material is detected. In step 170, the amount of the resistance change is measured. In step 172, the amount of the resistance change of the onset is compared to an expected amount of the resistance change for an expected contents of the leak source. In step 174, if the amount of the resistance change matches the expected amount, the system proceeds to signal an alarm in step 176.

EXAMPLES

1. A one-dimensional smart coating for a structure comprising a mesh configuration of non-conductive filaments laid in one direction and conductive filaments laid in a perpendicular direction to form a single layer mesh which applied to the structure as a coating along with a material the resistivity of which changes with exposure to a stimulus, the stimulus including at least one of: presence of a hydrocarbon, temperature, pressure, stress, strain on the coating material; where resistance between adjacent conductive filaments is measured and the measurement can be used to detect and determine the location in one dimension of the stimulus.

2. A two-dimensional smart coating comprising two layers of conductive mesh coated with a sensing coating of example 1, the two layers having conductive filaments oriented in different directions, and the two layers separated by an insulating layer, which may also be of mesh, the conductive filaments of the two layers of conductive mesh being electrically connected to an electronics subsystem comprising a signal receiving device, sensing conditioning module and processing device, the layered mesh configuration thus being capable of detecting and locating the sensed stimulus and its location in two dimensions.

3. A combination of a two dimensional smart coating of example 2 with a one dimensional smart coating of example 1 at a fixed distance to enable HC detection in the X,Y,Z axes, the layers of the two meshes being arranged so that the two dimensional smart coating detects the location of the hydrocarbon (X,Y axes), and the one dimensional smart coating measures the rate of travel of the hydrocarbon away from the structure in the Z axis, since the 1D mesh is positioned at a known and fixed position from the two dimensional smart coating.

4. A combination of a one dimensional smart coating of example 1 with another one dimensional smart coating of example 1 at a fixed distance apart to enable HC detection over time in the X and Z axes, the two coatings arranged so that the first one dimensional smart coating detects the location of the hydrocarbon (X axis), and the second one dimensional smart coating measures the rate of travel of the hydrocarbon away from the pipe in the Z axis since the layers are positioned at a known and fixed separation (distance).

5. A deployment method for smart coating sensors comprising the materials of example 1 operatively electrically connected to measure resistivity within a portion of the materials and transmit that resistivity data for further processing, the transmission and data gathering means and sensors mounted along a tubular structure (for deployment adjacent to a hydrocarbon storage device) which enables access from the surface for maintenance of the sensors and which structure has a porous membrane at its (downhole) base to enable HCs to migrate to a sensor there, and into which additional sensors may also be installed.

6. A method of deploying sensors of example 5 by placing multiple sensors spaced at known distances from each other, so that the rate of travel of any sensed HC can be determined by measuring delays between detections of hydrocarbons at different sensors.

7. A supporting structure with a smart coating comprising the material and mesh any of examples 1, 2, 3 or 4 applied to the structure's outer surface, the structure for installation near to a HC transportation or underground storage system to detect HC leaks.

8. A three layer coating system for pipelines featuring a Fusion Bond Epoxy as an anti-corrosion layer next to the outer surface of the steel pipe of the pipeline, a second layer of an adhesive which has functional groups which bond to the FBE and an outer layer of a smart coating; all three layers being bonded together; and optionally a protective layer being applied on top of the smart coating to provide mechanical protection.

9. A multi-layer coating system for pipelines featuring a Fusion Bond Epoxy as an anti-corrosion layer next to the outer surface of the steel pipe of the pipeline, an adjacent adhesive layer which has functional groups which bond to the FBE, a next adjacent layer of polyolefin, and a next optional adhesive layer, all with a further adjacent outer layer of smart coating capable of HC leak detection or reaction to physical stimuli; where all of the layers are bonded together; further and optionally a protective layer is applied on top of the smart coating to provide mechanical protection.

10. A belt wrap for a pipe made of the mesh array of any of examples 1, 2, 3 or 4 wrapped around a Field Joint of the pipe. The mesh array may be capable of working in the presence of a Cathodic Protection current, for example by being permeable to ions.

11. A patch of the smart coating of any of examples 1, 2, 3 or 4 applied to a HC transportation or storage system.

12. A smart coating of any of examples 1, 2, 3 or 4 incorporated into a shrink wrap sleeve to provide both protection to a Field Joint and be capable of HC leak detection or reacting to physical stimuli.

13. A liquid epoxy formulation containing CNT (carbon nano tubes), or conductive and semi-conductive particles, that can be applied to a HC transport structure such as a pipe or section of pipe to provide corrosion protection and be capable of HC leak detection and reacting to physical stimuli.

14. A smart coating of any of examples 1-4 or 13 applied on top of a liquid epoxy on a pipe or section of pipe (such as in a Field Joint area) to add leak detection of HC and detection of physical stimuli to any corrosion protection provided by the liquid epoxy.

15. A combined Corrosion Protection/Leak Detection system which uses the same applied voltage to both polarise the steel structure to prevent corrosion (Cathodic Protection subsystem) and to measure the resistance of the smart coating or smart coating sensor (HC Leak Detection or strain or related stimulus detection subsystem) and thus capable of HC leak detection and reacting to physical stimuli; where measuring the resistance of the smart coating or smart coating sensor can be used to detect HCs, and measuring the CP current can be used to detect corrosion and coating integrity.

16. A method of analysing the rate of change in the resistance of a smart coating of any of examples 1-4 or 13 or a related smart coating sensor when exposed to HC that enables the determination of the type of HC present by comparing the instantaneous slope of a line between continuous resistivity measurements is determined and then compared to known values of electrical resistivity change characteristics of known HCs to identify the type of HC being sensed by the particular material of a particular smart coating sensor.

17. The system of any of the above examples where a status of a smart coating sensor may be reported locally and/or remotely using wired, acoustic or radio communications means including but not limited to meshed radio networks, Bluetooth, WIFI, cellular technologies, satellite, or Infrared methods.

In the claims as in the description, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A sensor system comprising:
    a first layer, a second layer and a third layer, the first layer comprising parallel conductive filaments oriented in a first direction, the second layer comprising parallel conductive filaments oriented in a second direction different from the first direction, and the third layer comprising parallel conductive filaments oriented in a third direction, each of the first layer, the second layer and the third layer including a stimulus sensitive material arranged to connect the parallel conductive filaments of the respective layer, the stimulus sensitive material having a resistivity which changes with exposure to a hydrocarbon;
    an insulating layer between and separating the first layer and the second layer;
    the third layer being separated from the first layer and the second layer by a known thickness of a medium permeable to the hydrocarbon;
    a first signal conditioning module connected to the parallel conductive filaments of the first layer and configured to measure resistance between adjacent parallel conductive filaments of the first layer;
    a second signal conditioning module connected to the parallel conductive filaments of the second layer and configured to measure resistance between adjacent parallel conductive filaments of the second layer; and
    a third signal conditioning module connected to the parallel conductive filaments of the third layer and configured to measure resistance between adjacent parallel conductive filaments of the third layer.

2. The sensor system of claim 1 in which the first signal conditioning module is the second signal conditioning module.

3. The sensor system of claim 2 in which the first signal conditioning module is the third signal conditioning module.

4. The sensor system of claim 1 in which the third direction is one of the first direction or the second direction.

5. The sensor system of claim 1 in which the parallel conductive filaments of the first layer are interwoven with non-conductive filaments oriented perpendicular to the first direction to form a mesh.

6. The sensor system of claim 1 in which the parallel conductive filaments of the second layer are interwoven with non-conductive filaments oriented perpendicular to the second direction to form a mesh.

7. The sensor system of claim 1 in which the parallel conductive filaments of the third layer are interwoven with non-conductive filaments oriented perpendicular to the third direction to form a mesh.

8. The sensor system of claim 1 in which the parallel conductive filaments of the first layer are embedded in a nonconductive fabric.

9. The sensor system of claim 1 in which the parallel conductive filaments of the second layer are embedded in a nonconductive fabric.

10. The sensor system of claim 1 in which the parallel conductive filaments of the third layer are embedded in a nonconductive fabric.

11. The sensor system of claim 1 in which a sensor layer of a coating for a pipeline includes the first layer, the second layer, the third layer, the insulating layer, and the known thickness of the medium, the coating further comprising:
   a fusion bond epoxy layer adjacent to the outer surface of the pipeline; and
   an adhesive layer bonding the sensor layer to the fusion bond epoxy layer.

12. The sensor system of claim 11 further comprising a protective layer applied on top of the sensor layer.

13. The sensor system of claim 1 in which a sensor layer of a coating for a pipeline includes the first layer, the second layer, the third layer, the insulating layer, and the known thickness of the medium, the coating further comprising:
   a fusion bond epoxy layer adjacent to the outer surface of the pipeline;
   a polyolefin layer;
   an adhesive layer bonding the polyolefin layer to the fusion bond epoxy layer;
   the sensor layer being bonded to the polyolefin layer.

14. The sensor system of claim 13 further comprising an additional adhesive layer bonding the sensor layer to the polyolefin layer.

15. The sensor system of claim 13 further comprising a protective layer applied on top of the sensor layer.

16. The sensor system of claim 1 in the first layer, the second layer, the third layer, the insulating layer, and the known thickness of the medium are included in a belt wrap for wrapping around a field joint of a pipe.

17. The sensor system of claim 1 in which the first layer, the second layer, the third layer, the insulating layer, and the known thickness of the medium are included in a patch for a hydrocarbon storage or transportation system.

18. The sensor system of claim 1 in which the first layer, the second layer, the third layer, the insulating layer, and the known thickness of the medium are included in a shrink wrap sleeve for a field joint of a pipe.

19. The sensor system of claim 18 in which the shrink wrap sleeve further comprises one or more additional layers for providing additional protection to the field joint.

20. The sensor system of claim 1 in which the first layer, the second layer, the third layer, the insulating layer, and the known thickness of the medium are included in a coating for a pipe and are applied to the pipe on top of a liquid epoxy.

* * * * *